Figure 1:
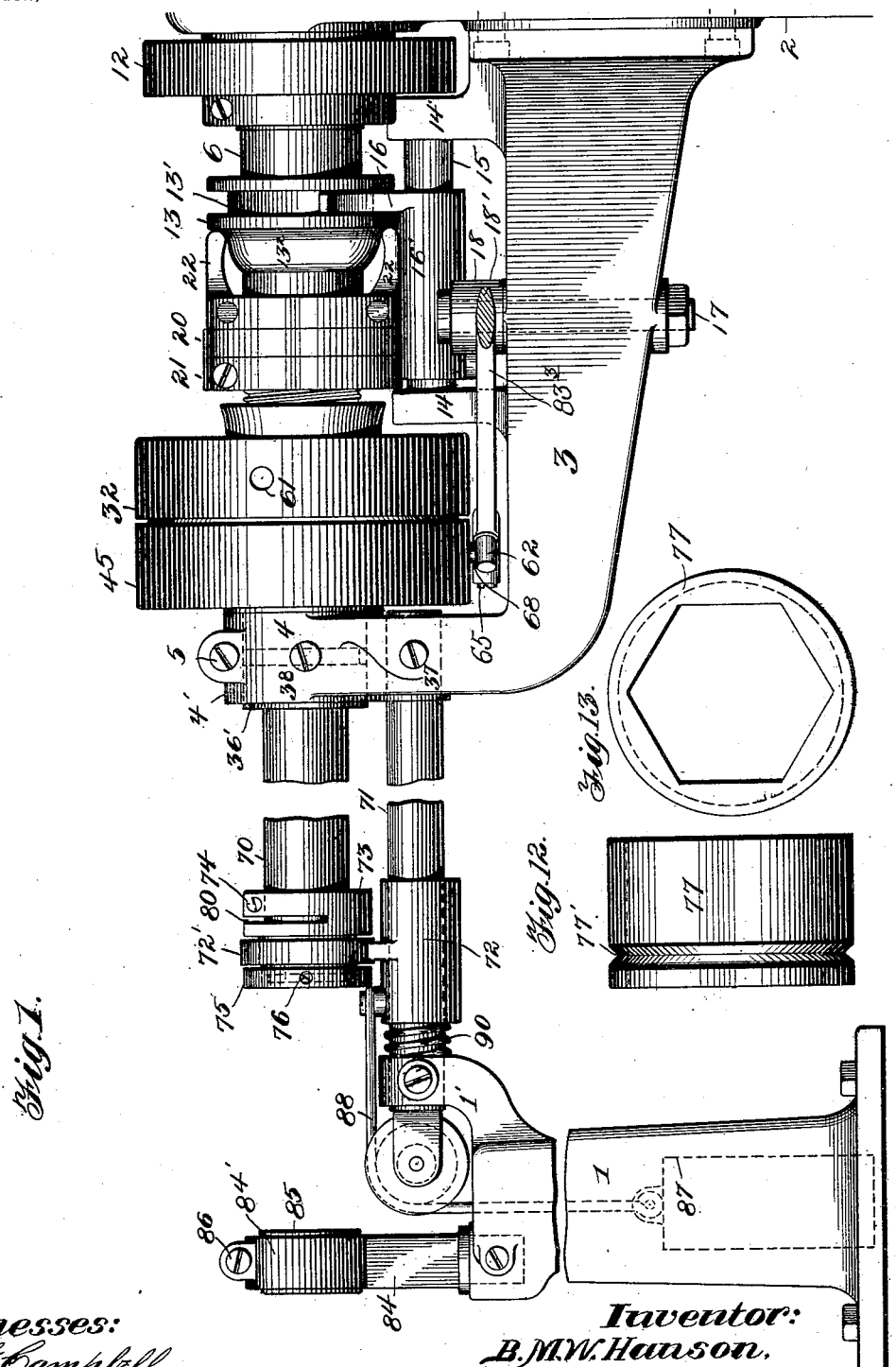

No. 711,852. Patented Oct. 21, 1902.
B. M. W. HANSON.
FEED MECHANISM FOR METAL WORKING MACHINES.
(Application filed Feb. 25, 1902.)
(No Model.) 7 Sheets—Sheet 4.
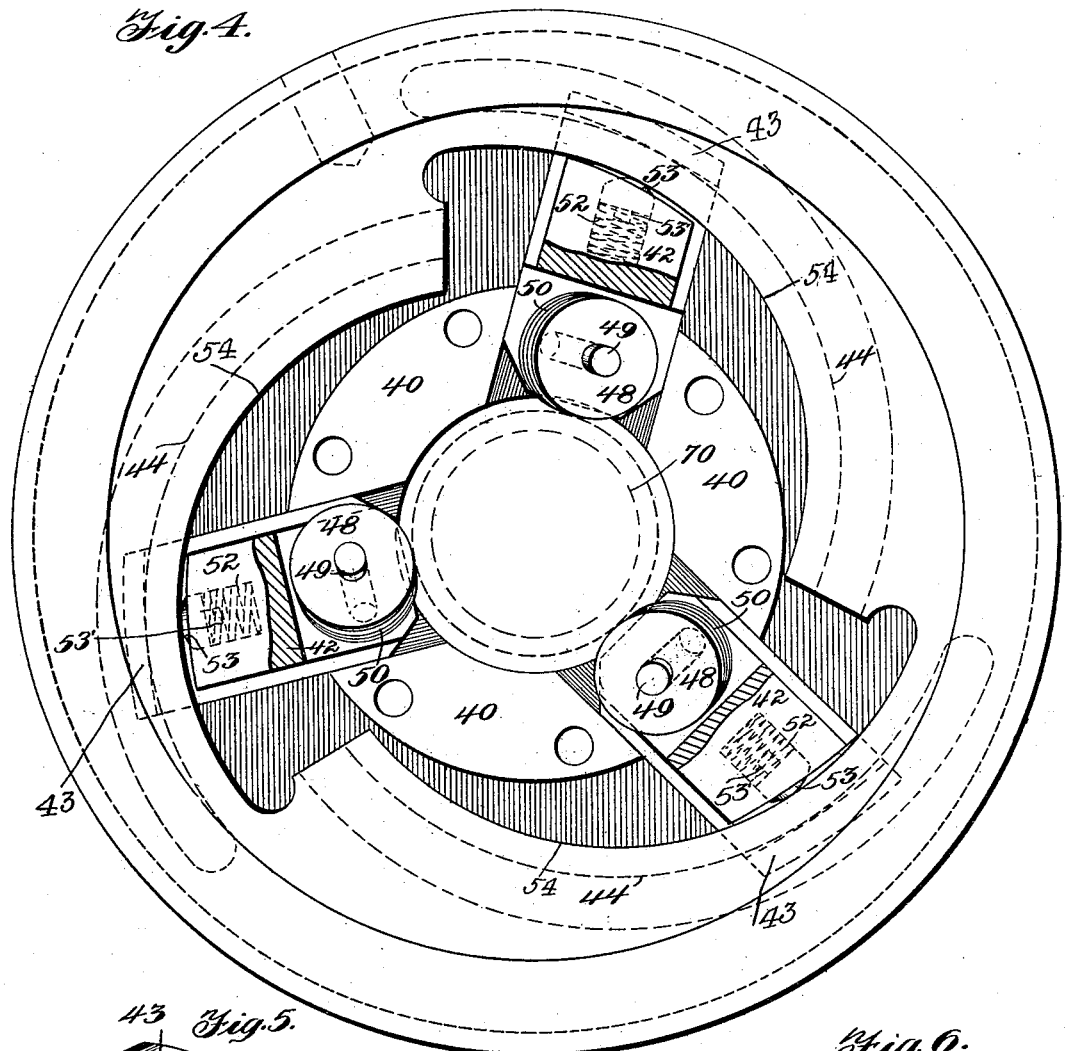
Fig. 4.
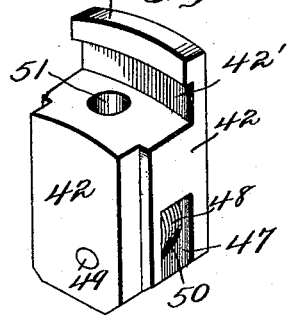
Fig. 5.
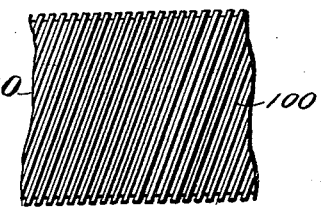
Fig. 16ᵃ
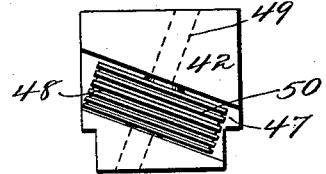
Fig. 6.
Witnesses:
F. G. Campbell
Frances E. Blodgett
Inventor:
B. M. W. Hanson,
By his Attorneys:
Blodgett and Peck
THE NORRIS PETERS CO., PHOTO-LITHO., WASHINGTON, D. C.

No. 711,852. Patented Oct. 21, 1902.
B. M. W. HANSON.
FEED MECHANISM FOR METAL WORKING MACHINES.
(Application filed Feb. 25, 1902.)
(No Model.) 7 Sheets—Sheet 5.

Fig. 6.ª

Witnesses: Inventor:
H. G. Campbell B. M. W. Hanson,
F. E. Blodgett. By his Attorneys,
Blodgett and Peck No. 711,852. Patented Oct. 21, 1902.
B. M. W. HANSON.
FEED MECHANISM FOR METAL WORKING MACHINES.
(Application filed Feb. 25, 1902.)
(No Model.) 7 Sheets—Sheet 6.
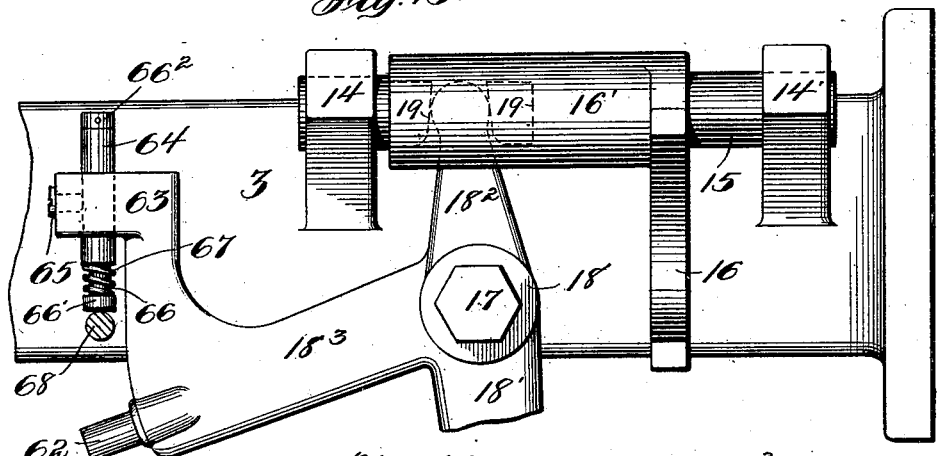
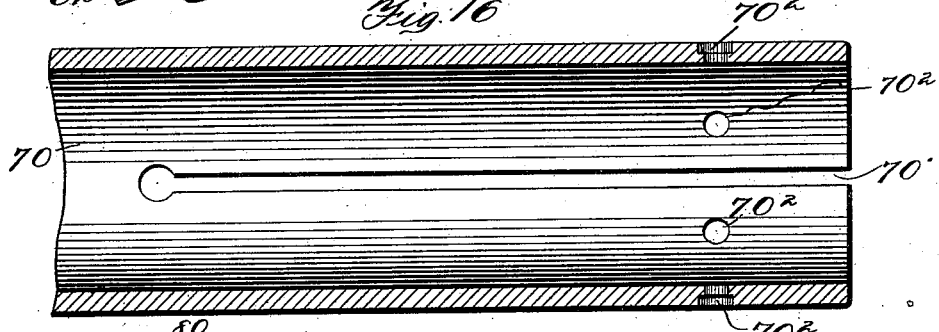
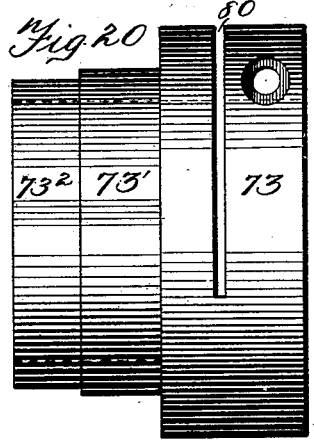
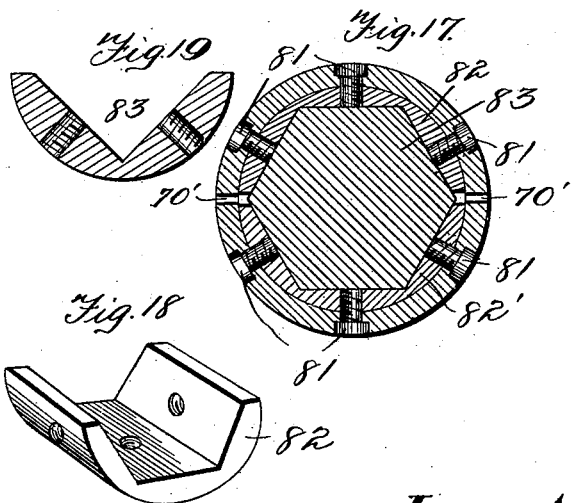
Witnesses:
F. G. Campbell.
F. E. Blodgett
Inventor:
B. M. W. Hanson.
By his Attorneys
Blodgett and Peck No. 711,852. Patented Oct. 21, 1902.
B. M. W. HANSON.
FEED MECHANISM FOR METAL WORKING MACHINES.
(Application filed Feb. 25, 1902.)
(No Model.) 7 Sheets—Sheet 7.

Witnesses:
F. G. Campbell.
F. C. Blodgett.

Inventor:
B. M. W. Hanson:
By his Attorneys:
Blodgett & Poch

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FEED MECHANISM FOR METAL-WORKING MACHINES.

SPECIFICATION forming part of Letters Patent No. 711,852, dated October 21, 1902.

Application filed February 25, 1902. Serial No. 95,637. (No model.)

*To all whom it may concern:*

Be it known that I, BENGT M. W. HANSON, a subject of the King of Sweden and Norway, residing at Hartford, in the county of Hartford and State of Connecticut, have invented certain new and useful Improvements in Feed Mechanism for Metal-Working Machines, of which the following is a specification.

My invention relates to means for feeding stock to the chucks of metal-working machines, such as screw-machines and cutting-off and forming machines of various kinds.

Heretofore, to the best of my knowledge and belief, the feed mechanism of machines of the kind mentioned has been adapted to act upon but one form of stock—for instance, a cylindrical rod, bar, or wire—and when it has been desired to utilize stock of angular or other non-circular shape in cross-section special machines have had to be employed for this purpose, thereby incurring great expense and much inconvenience in supplying orders for different kinds of work.

Primarily the object of my invention is the provision of novel feed mechanism for advancing stock of angular cross-section of any kind, size, or proportions to or through the chuck of the machine.

A further object of the invention is the provision, in a machine provided with means for feeding round or circular stock to the chuck, of means, broadly, for enabling said feed mechanism to advance stock of different cross-section to said chuck.

A further object of the invention is the provision of an attachment to a machine of the classes mentioned, said attachment being of such construction that stock of other form than circular in cross-section may be fed to the chuck of the machine.

A further object of the invention is the provision of a feed-spindle adapted to be acted upon by the feed mechanism, and means carried by said spindle and fitting the cross-sectional form of the stock it is desired to feed to the chuck of the machine.

A further object of the invention is the provision with feed mechanism of any suitable kind of a feed-spindle adapted to be acted upon by said feed mechanism and of removable and interchangeable devices carried by said spindle for enabling it to receive stock of any desired cross-section which it is desired to advance to the chuck.

A further object of the invention is the provision of a device for holding the stock and of means for feeding said device to advance said stock to the chuck.

A further object of the invention is the provision of a feed-tube for receiving the stock, means for advancing and withdrawing said tube, and detachable and interchangeable jaws carried by said tube and adapted to fit the form of stock it is desired to advance to the chuck.

A further object of the invention is the provision of a movable carrier for the feed-tube, said carrier being so mounted that it may be shifted out of position when said tube is withdrawn and the feed mechanism is employed for advancing ordinary stock circular in cross-section to the chuck.

Further objects of the invention will be set forth in the detailed description hereinafter given.

Figure 2:
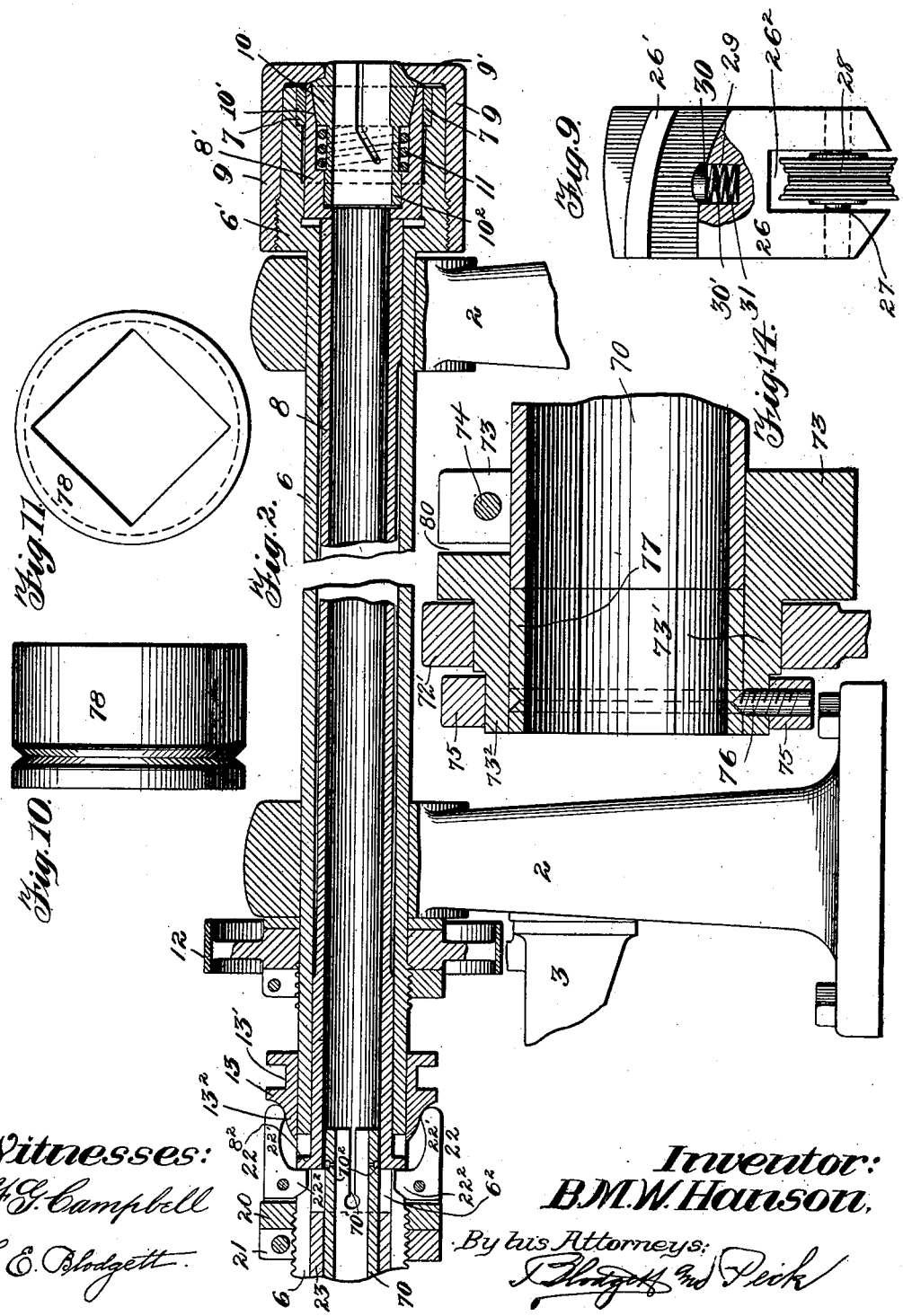
Figure 3:
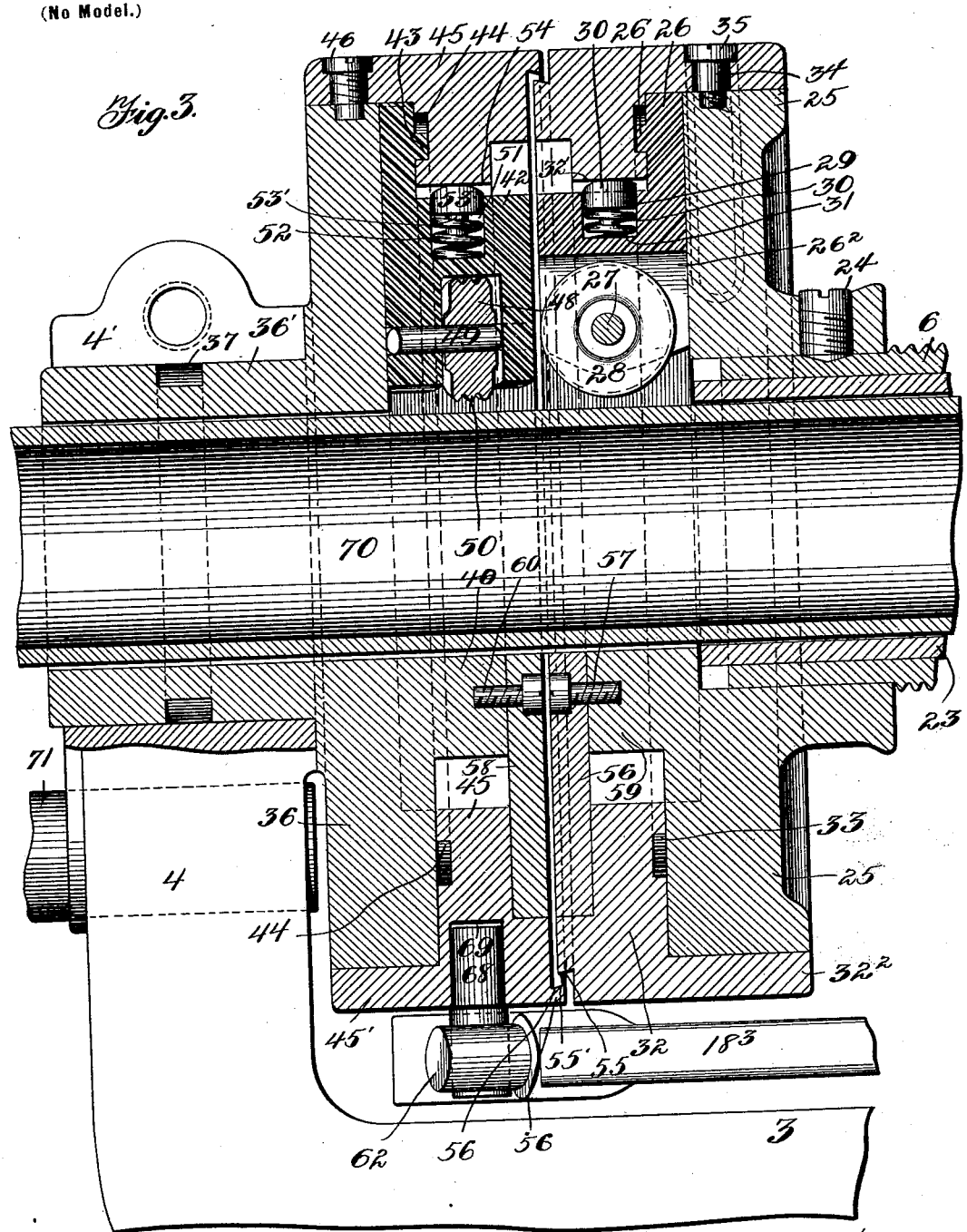
Figure 7:
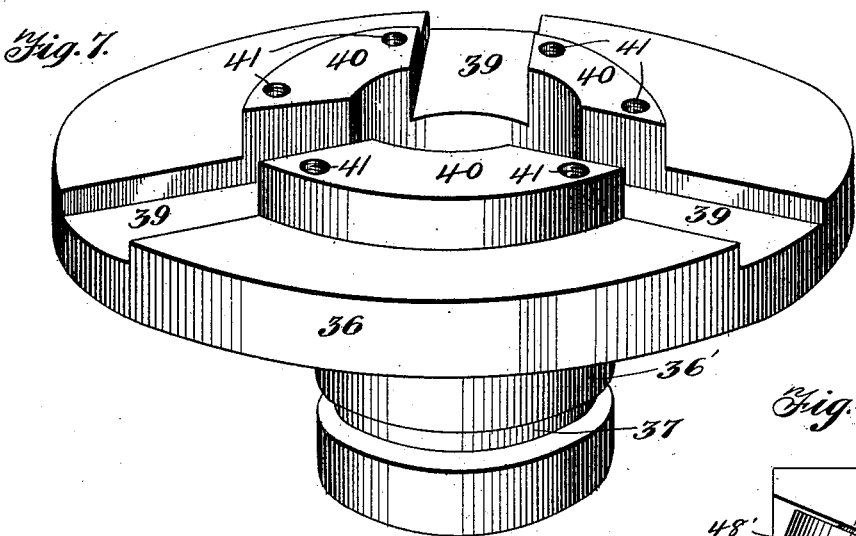
Figure 8:
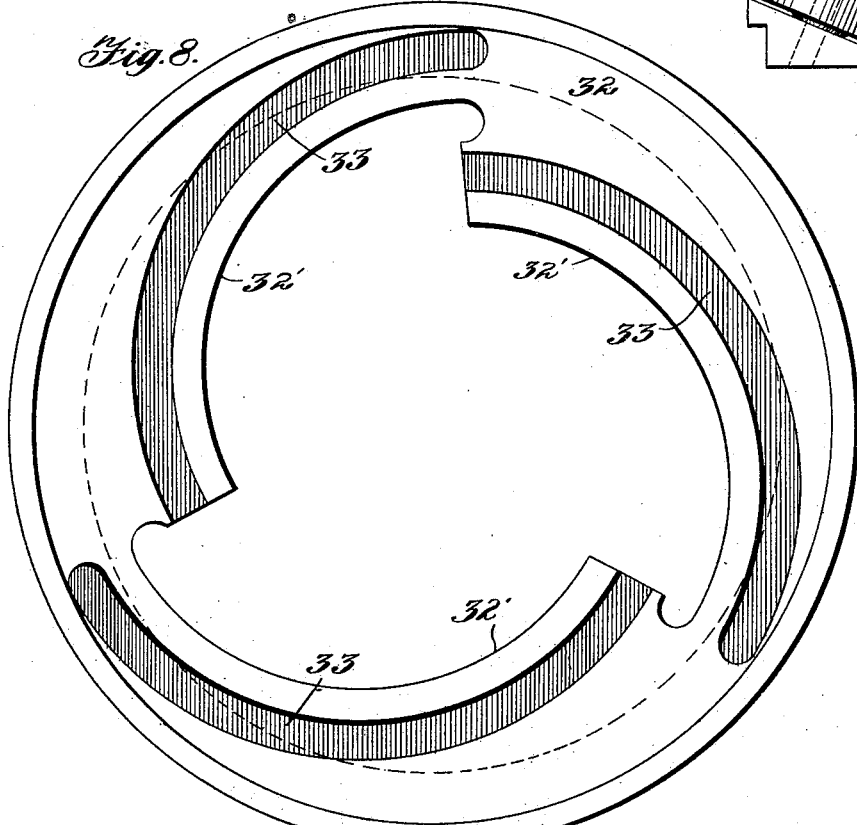
Figure 21:
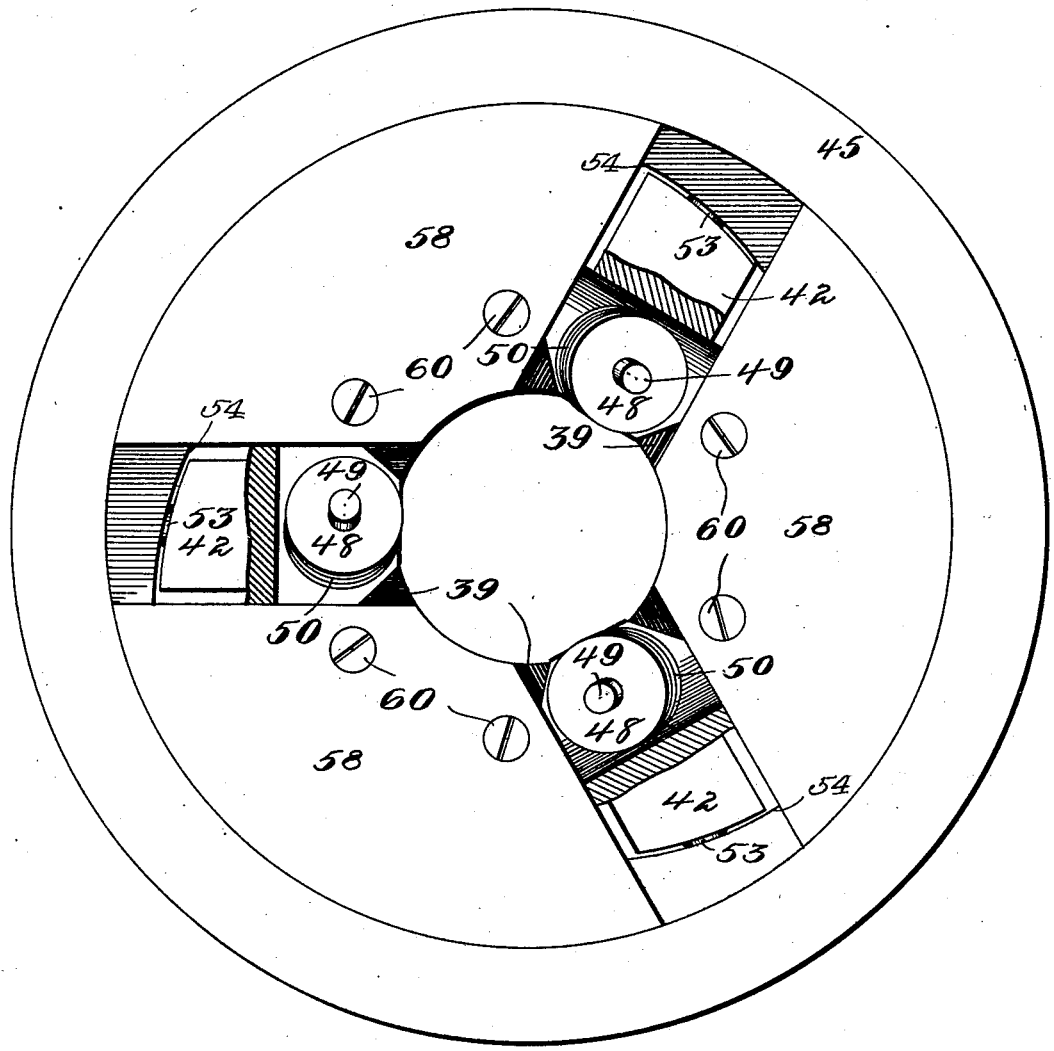

In the accompanying drawings, Figure 1 is a side elevation of part of the feed mechanism of a metal-working machine. Fig. 2 is a longitudinal vertical section of another part of said feed mechanism. Fig. 3 is a longitudinal vertical section of the means employed for advancing stock to the chuck. Fig. 4 is an elevation, partially in section, of the roller feed mechanism and the head in which it is mounted. Fig. 5 is a perspective view of one of the blocks in which the feed-rollers are mounted. Fig. 6 is a bottom plan view of one of the feed-roller blocks, showing the construction and position of the feed-roller, and Fig. 6ª, Sheet 5, is a similar view of a modification. Fig. 7 is a perspective view of the feed-roller chuck-head. Fig. 8 is a view in elevation of the inner face of the cam-ring employed for actuating the blocks carrying the rollers for rotating the feed-tube. Fig. 9, Sheet 2, is a side elevation of one of the blocks carrying the rollers for rotating the feed-tube or the stock when said tube is withdrawn. Fig. 10 is a side elevation of one of the interchangeable bushings employed in connection with the feed-tube, and Fig. 11 is a front elevation of said bushing. Figs. 12 and 13 are respectively side and front views of a different form of interchangeable bushing. Fig. 14 is a longitudinal vertical section of a portion of the feed-tube, showing the split sleeve, the shiftable yoke, and one of the interchangeable bushings. Fig. 15 is a plan view of part of the bracket for supporting the feed mechanism and of the lever mechanism thereon, the handle of the lever being broken away. Fig. 16 is a longitudinal vertical section of part of the feed-tube, and Fig. 16$^a$, Sheet 4, is a similar view, on a reduced scale, of part of a threaded feed-tube. Fig. 17 is a transverse section of the feed-tube, showing one form of stock-clasping jaws and the stock in section. Fig. 18 is a perspective view of one of the stock-clasping jaws shown in section in Fig. 17. Fig. 19 is a sectional view of a different form of jaw. Fig. 20 is a side elevation of a collar carried by the feed-tube, and Fig. 21 is a plan view, partially in section, of the chuck carrying the feed-rollers.

Like numerals designate similar parts throughout the several views.

Referring to the drawings, the numerals 1 and 2 denote supporting standards or framework of my improved feeding mechanism, and the numeral 3 indicates a bracket projecting from one of the standards and having a vertical extension 4, terminating in a split bearing 4', the split parts of said bearing being united by a binding-screw 5.

Within bearings of the standards 2 is mounted a hollow rotary spindle 6, having a chuck-head 6', provided with a circular wear plate or ring 7, inserted in a rabbeted portion of its open end. Within this spindle 6 is a hollow spindle 8, through which the stock is fed, said spindle having an outwardly-flaring head 8'. Surrounding the head 6' is a sleeve or shell 9, having an open end 9' for the reception of the extremity of a split chuck 10, having an inclined surface 10' and a hollow stem 10$^2$, and encircling said hollow stem 10$^2$ and located between shoulders of the chuck 10 and head 8' is a spring 11, the tendency of which is to force the spindle 8 backward, and thereby permit the chuck to expand and release the stock.

Secured to spindle 6 is a pulley, or it may be equivalent element 12, to which power is applied for rotating said spindle, and loosely fitted upon the spindle is a sleeve 13, having a circular groove 13' and a conical end 13$^2$. Projecting vertically from bracket 3 are short standards 14 14', carrying a guide-rod 15, and sleeved upon this rod between said standards is the hub 16' of a fork 16, the latter fitting into the groove 13' of the shiftable sleeve 13.

Pivoted to the bracket 3 upon a bolt 17 is a a lever 18, having a handle 18', an extension 18$^2$, and an angular portion 18$^3$, said extension 18$^2$ being inserted between a pair of lugs 19, located on the inner side of the sleeve 16', reciprocatory on guide-rod 15. Threaded upon the spindle 6 is a collar 20, locked against rotation by a split ring or nut 21, and pivoted to this collar 20 are levers 22, having tails 22', resting upon the conical portion 13$^2$ of sleeve 13, and angular projections 22$^2$, abutting against a flange 8$^2$ of spindle 8, said projections passing through slots 6$^2$ in the spindle 6, as shown in Fig. 2. From the above description it follows that when the sleeve 13 is reciprocated to tilt the levers 22 upon their pivots the projections 22$^2$ of said levers will force the tube 8 longitudinally in the spindle 6, thereby causing the head 8' to contract the split chuck 10 to make it grasp the work, and that when said conical portion is withdrawn from beneath the levers the spring 11 will force back said tube 8, and thereby permit the chuck to expand and release the work.

While a conventional stock-chucking device is shown, it is distinctly to be understood that my invention is not limited thereto, for any suitable chuck mechanism may be employed as a substitute therefor, if desired.

Designated by the numeral 23 and located in the slotted rear end of spindle 6 is a bushing, and secured to said spindle by a screw 24 is the hub of a chuck 25, which will be hereinafter described and which by the connection described or any other suitable substitute therefor is caused to rotate with said spindle 6.

Mounted in guideways of the chuck-body are blocks 26, having cam-ribs 26', and located in slots 26$^2$ of said blocks upon rods or spindles 27 are ribbed or corrugated rollers 28, said rollers being grooved and being so arranged that their grooves are in line with the stock feed-tube hereinafter described. Any desired number of said blocks and rollers may be employed, the invention not being limited in this respect; but I have found three to be sufficient for all practical purposes, and a chuck for receiving this number is shown in the drawings. By concaving the rollers 28 and providing them with ribs or corrugations, as shown, each roller readily conforms to the periphery of the feed-tube and has a good grasping-surface thereon, and by so mounting the rollers that they have limited lateral play they will readily conform to any inequalities in the surface of said tube, or of round stock should the tube not be used, without affecting their holding or grasping functions. The rollers 28 may be mounted in other ways to permit of this movement, if desired, the invention not being limited to the specific manner shown and described.

Each of the blocks 26 is provided with a chamber 29, containing a plunger 30, having a stem 30', surrounded by a spring 31, which may be of any desired kind suitable for the purpose. These plungers have rounded tops bearing against cam-surfaces 32' of the face-plate 32 of the chuck, said face-plate having cam-grooves 33 for the reception of the studs or lugs 26' of blocks 26 and also having an extension 32² overlapping the periphery of the chuck-body 25, as shown in Fig. 3. This extension is slotted at 34, (see dotted lines, Fig. 3,) and the face-plate is secured to said chuck-body by a screw 35, the head of which is fitted in a rabbet of the slot, said screw having a barrel fitting said slot and an end threaded into the chuck-body, as shown in said Fig. 3. As shown by Fig. 3, the width of the cam-lug or rib 26' of each block 26 is less than that of the cam-groove 33, in which it works, and by sustaining said blocks 26 in the manner described they are permitted a slight yielding movement to enable the rollers 28 to conform to inequalities of either the feed-tube or stock upon which they operate and which they cause to rotate.

Any suitable means for yieldingly supporting the blocks 26 in the ways of the chuck-head 25 may be employed as a substitute for those shown without departure from the invention.

Designated by the numeral 36 is a feed-roller chuck-head having a hub 36', mounted in bearing 4' of extension 4 of bracket 3, said hub having a circumferential groove 37 for the reception of the plain end of a screw 38, carried by the bearing, as shown in Fig. 1. This chuck-head 36 is provided with a series of radial guide grooves or ways 39 and with projections 40, of segmental form, in which are formed openings 41, having threaded walls, as illustrated in Fig. 7. Fitted in the guideways 39 of the chuck-head 36 are sliding blocks 42, one of which is shown detached in Fig. 5 and each of which has an extension 42', provided with a cam rib or projection 43, of less width than and adapted to fit in the cam-grooves 44, formed in the inner side of a face-plate 45, having a circular lip or extension 45' overlapping the chuck head or body 36, as shown in Fig. 3, and secured thereto by a screw 46, threaded into said extension and having a tip fitting in a slot of the body 36, the end walls of said slot preventing the face-plate from being rotated so far that the cams thereof will leave the cam-ribs of the blocks.

To prevent binding of the cam-ribs 43 of blocks 42 in the cam-grooves 44 of face-plate 45 and of the cam-ribs 26' of blocks 26 in cam-grooves 33 of face-plate 32, said ribs and grooves are formed on arcs of different radius, as shown by dotted lines in Fig. 4.

Each block 42 is slotted diagonally in its end opposite cam-rib 43 at 47 to receive either a ribbed feed-roller 48 or a plain feed-roller 48', Fig. 6ª, carried by a pin 49, journaled in the block, and each of these feed-rollers 48 is provided with a series of parallel threads or ribs 50, which engage the periphery of the feed-tube, hereinafter described, or of the stock, should said feed-tube be omitted.

In each of the blocks 42 is a socket 51 for the reception of a spring 52, surrounding the stem 53' of a pin or plunger 53, the rounded head of which bears against a cam-surface 54 of the same arc of curvature as the cam-groove 44. As will be observed, the blocks 42 are yieldingly supported in the same manner as the blocks 26 of chuck 25 and for the same purpose—viz., to enable the feed-rollers to accommodate themselves to unevenness occurring in the periphery of the work upon which they act.

As shown in Fig. 3, the face-plate 32 is provided with a circular lip or projection 55, having an undercut or inclined periphery 55', this lip or projection being of less diameter than the body of said face-plate and being inserted within an overhanging circular lip 56 on face-plate 45 of chuck-head 36, said lip 56 being inwardly inclined at 56' and the joint construction subserving the purpose of preventing lubricant from being thrown off by centrifugal force by the rotary face-plate 32.

For retaining the blocks 26 in the guideways 39 of chuck-head 25 segmental plates 56, secured to the projections 59 of said head by bolts 57, are employed, and for accomplishing a like purpose with reference to the feed-roller-carrying blocks 42 similar plates 58 (see Fig. 21) are secured to the segmental projections 40 of chuck-head 36 by bolts 60, as shown in Fig. 3.

For turning the face-plate or cam-ring 32 it may be provided with a socket 61, in which any convenient tool may be inserted when it is desired to rotate said ring and force the rollers 28 against the work. Other ways may be adopted for accomplishing such result, the invention not being limited in this respect. It is important, however, that the chuck 10 should be open when the feed-rollers 48 are forced against the work and that said chuck should be closed when the desired feed movement—the length of which may be controlled by an adjustable stop (not shown) in the usual manner—is effected, and while any desired means suitable for accomplishing the purpose may be adopted without departure from the invention I have found it convenient to utilize the lever 18. This lever is, as above stated, provided with an extension 18², the end of which is located between the lugs 19 of sleeve 16', carrying the yoke 16, said yoke being inserted in the groove 13' of the cone-sleeve 13 and the latter through the pivoted levers 22 and hollow spindle 8, with its flaring head 8', actuating the chuck to cause it to assume the closed position represented in Fig. 2 when moved in one direction and releasing said parts when reciprocated in the opposite direction. Projecting from the arm 18³ of the lever 18 is a pin or stud 62, and carried in an angular perforated projection 63 is a tube 64, secured in place by a screw 65 or otherwise. Seated in said tube 64 is a yieldingly-mounted plunger 66, having heads 66' and 66², and surrounding the stem of said plunger between the end of tube 64 and the head 66' is a spiral spring 67. Projecting from the cam-ring 45 is a pin or stud 68, preferably fitted in a socket 69 of said ring, as shown in Fig. 3, and when the handle 18' of lever 18 is moved to the right or to the position represented in Figs. 1 and 15 the chuck 10 is closed upon the stock-carrier and the cam-ring 45 has been moved by the plunger 66 to withdraw the feed-rollers from engagement with said carrier. To insure a quick closing movement of the chuck 10 upon the stock, the lever 18 is swung rapidly or with a jerk toward the right, and to enable this jerk to take place and also to shift the cam-ring 45 gradually to withdraw the feed-roller blocks 42 the spring-controlled plunger 66 acts as a buffer when it strikes under the sudden impulse given said lever the stud or pin 68, projecting from the cam-ring.

To open the chuck 10 and turn the cam-ring 45 to force the feed-rollers 48 against the stock-carrier, the lever 18 is shifted in the opposite direction or toward the left, thereby throwing the cone-sleeve 13 along the spindle 6 and withdrawing it from beneath the tails of the levers 22, and thus enabling the spring 11 to force back the spindle 8 and permit the chuck to expand and assume its open position. During this action force must be applied to the lever 18 gradually to cause the pin 62 slowly to force over the stud 68 and the cam-ring 45 to close the feed-rollers upon the stock-carrier. As has been before stated, these feed-rollers are provided with circumferential ribs 50, which may be of any desired number suitable for the purpose, and as they are set at an angle to throw their working surfaces diagonally across the object it is desired to have them advance said ribs will act as screw-threads when said object is rotated by the rollers 28 and will cause the desired feed movement to be imparted.

In the present invention the feed-rollers are shown as adapted to advance a stock-carrier, (shown as a feed-tube 70 of peculiar construction,) which will now be described. This stock-carrier constitutes an important feature of the invention, for by its use stock of any desired form in cross-section may be fed to the chuck of the machine.

Designated by the numeral 71 and secured in perforations of extension 4 of bracket 3 and of an arm 1' of standard 1 is a guide-rod, upon which is sleeved a hub 72, carrying a ring or eye 72', and designated by 73 is a split sleeve or collar having stepped portions 73' and 73² of different diameters, said collar being secured to the tube by a binding-screw 74. As shown in Fig. 1, the ring or eye 72' is loosely fitted over the stepped portion 73' of collar 73 and is located between a shoulder formed by the enlarged split part of said collar and a ring 75, secured on the stepped portion 73² of the collar and to a bushing 77, hereinafter described, by a screw 76, having a conical end, as illustrated in Fig. 14. As shown by dotted lines in Fig. 1 and by full lines in Figs. 12, 13, and 14, a bushing 77, having a bore adapted to fit the configuration of the stock to be fed, is secured in the rear end of the sleeve or collar 73 by the screw 76. These bushings are interchangeable, and each is provided with a circumferential groove 77' to receive the end of screw 76, passing through the ring 75 and stepped portion 73² of the collar 73. For instance, if it is desired to utilize square stock a bushing 78, having a square bore, Figs. 10 and 11, will be secured in the collar in line with the end of the feed-tube, and if hexagonal stock should be required this bushing will be removed and a bushing 77, Figs. 12 and 13, having a hexagonal bore, will be fitted in and secured to said collar. Sets of these interchangeable bushings are provided for each machine, and in this way the feed-tube is adapted to receive any desired configuration of stock that may be required.

To avoid the necessity of splitting the wall of collar 73 along its entire length, a transverse kerf 80 is made in the enlarged portion of said collar, and this enables the screw 76 to force the longitudinally-split section of the same tightly against the feed-tube 70. (See Figs. 1, 14, and 20.)

At its forward end the feed-tube 70 is longitudinally split at 70', and said end of the tube passes through the bushing 23 and enters the rear extremity of the tubular chuck-actuating spindle 8, as illustrated in Figs. 2 and 16. In this split end of the feed-tube are formed perforations 70², having enlargements at one end for the reception of screws 81, the heads of which are seated in said enlargements. Interchangeable jaws 82 82', having curved peripheries to fit the inner surface of the tube and inner faces of a configuration to accord with the shape of the work it is desired to feed, are secured to the end of the tube by means of the screws 81 aforesaid, and these jaws are, like the bushings 77 and 78, furnished in sets, so that by substituting one set for another the feed-tube may be adapted to receive any desired form of stock. Owing to the resilient end of the feed-tube the jaws are caused to grasp the stock, as shown in Fig. 17, where said jaws are in engagement with a stock rod or bar 83 of hexagonal form in cross-section, and of course when jaws of this form are employed a bushing 77, having a bore of similar form, will be secured in the collar 73 adjacent to the opposite end of the feed-tube. Should it be desired to feed stock of different shape—for instance, of square form in cross-section—the jaws 82 82' and bushing 77 will be removed and jaws 83, Fig. 19, and a bushing 78, Fig. 11, will be substituted therefor, and in this way stock of any required configuration may be carried by the feed-tube and advanced by the feed-rollers acting on said tube through the chuck. Here it may be stated that the invention is not limited to a feed-tube having interchangeable jaws and bushings nor to feed-rollers for advancing said tube, for it includes within its purview any carrier adapted to receive different forms of stock and any mechanism for rotating said carrier and for imparting to it a feed movement. So, too, in some instances interchangeable feed-tubes having inner configurations suitable to receive and grasp the stock may be employed, in which event detachable jaws and bushings would not be necessary. The stock-carrier 70 may also be plain, as shown in Fig. 16, or threaded at 100 to be more readily engaged by the rollers 48, as illustrated, on a reduced scale, in Fig. 16ª. For guiding the stock bar, rod, or wire a standard 84 is detachably secured to the column 1, and this standard is provided with a split eye 84' for the reception of a bushing 85, a binding-screw 86 being employed to force the eye to grasp said bushing, as shown in Fig. 1.

For retracting the feed-tube after the stock has been grasped by the chuck 10 and the feed mechanism has been withdrawn from engagement therewith any desired means may be employed; but I have found useful for that purpose a weight 87, (see dotted lines, Fig. 1,) connected by a cord, chain, or strap 88, the latter passing over a pulley 89 to the sleeve 72, and to cushion the blow of this sleeve a buffer-spring 90 may be placed between the end of the perforated arm 1' of column 1 and the extremity of said sleeve.

In the operation of my improved machine when constructed as shown a bushing 77 is introduced in and secured to the collar 73, carried by feed-tube 70 and jaws 82 82', having grasping-faces of the same shape as the bore of said bushing 77, or, in other words, of the shape of the stock, are attached to the inner resilient end of said tube 70. A stock rod, bar, or wire of the desired configuration is then introduced through the bushing 85, the bushing 77, and into the feed-tube 70 until it passes through and is grasped by the jaws 82 82', and its end protrudes from the chuck, which at this time is open and abuts against the usual stop. The handle of lever 18 is then grasped and moved to the right, thereby through the connections described closing said chuck upon the stock, and the cam-ring 32 is then shifted to actuate the sliding blocks 26 and cause the rollers 28 to engage the periphery of the feed-tube. By now applying power to the pulley or other element 12 of spindle 6 said spindle, the chuck 10 controlled thereby, and the chuck 25 are rotated until the required operations by the tools of the machine with which my improved mechanism is employed have taken place, and after the article has been formed on and severed from the end of the stock bar or rod a feed movement is necessary to enable another article to be made. When this feed movement takes place, the chuck 10 must be open and the rollers 28 in contact with the feed-tube 70. Lever 18 is then turned toward the left in the arrangement of the mechanism shown, thereby withdrawing the cone-sleeve 13 from contact with levers 22 and permitting the spring 11 to force back the spindle 8 and the chuck to expand to its open position. A further gradual movement of said lever 18 to the left causes the pin or stud 62 to engage the stud 68 of cam-ring 45 to shift said ring and cause the cam-grooves 44 thereof to actuate the blocks 42 and force the feed-rollers into contact with the feed-tube, and from this action it follows that inasmuch as the chuck 36 is stationary and the chuck 25, carrying the grooved and ribbed rollers 28, rotates with the spindle 6 the feed-tube 70 will also be rotated against the ribs 50 of the diagonally-arranged rollers 48, and that said ribs will, acting as screw-threads, impart a forward feed movement of the desired duration to said tube and to the stock carried thereby. After the stock has been advanced to the desired extent the lever 18 is given a quick movement to the right, the chuck 10 is closed by the mechanism controlled by said lever, and the spring-actuated plunger 64 by engaging the stud 68 shifts the cam-ring 45 to withdraw the blocks 42 and the feed-rollers 48. When said feed-rollers are retracted, the feed-tube 70 is withdrawn by the weight 87 to shift its jaws 82 82' to a position on the stock in readiness for a new feed.

Should it be desirable to employ the feed-rollers and other elements of the machine for direct action upon ordinary stock, the feed-tube 70 is removed and the sleeve 72 is swung over on rod 71 to withdraw the eye 72' from the path of said stock.

Changes in the location and arrangement of the various parts of the mechanism described may be made without departure from the invention, which is not limited in this respect, and while manually-operated chuck and feed mechanisms are set forth it is distinctly to be understood that the invention is not restricted thereto, for by suitable mechanical changes all of said mechanisms may be operated automatically, if desired.

No claim is herein made to the details of the feed mechanism when employed for use with ordinary round stock, for these features constitute the subject-matter of my application filed February 20, 1902, Serial No. 94,912.

Having thus described my invention, what I claim is—

1. The combination, with a stock-carrier, of means for rotating said carrier, and means obliquely disposed with relation to said carrier, and serving to impart a feed movement thereto.

2. The combination, with a stock-carrier, of means for rotating said carrier; means obliquely disposed with relation to said carrier, and serving to impart a feed movement thereto; a chuck to which the stock is fed; and means for actuating said chuck.

3. The combination, with a stock-carrier, of obliquely-disposed means for actuating said carrier to impart a feed movement to the stock; means for rotating the carrier; a chuck to which the stock is fed; and a spindle through which the stock is advanced to the chuck.

4. The combination, with a stock-carrier, of means for rotating said carrier, and an obliquely-disposed roller for imparting a feed movement to the carrier.

5. The combination, with a stock-carrier, of means for rotating said carrier; obliquely-disposed rollers adapted to engage the carrier; and means for forcing said rollers toward, and withdrawing them from, said carrier.

6. The combination, with a feed-tube having detachable stock-grasping jaws, of means for rotating said tube; a statonary support; and a device carried by said support, and located obliquely to said feed-tube.

7. The combination, with a stock-carrier, of a revoluble chuck; means carried by said chuck, and adapted to engage said stock-carrier; a stationary chuck; and an obliquely-disposed roller carried by the stationary chuck, said roller serving to impart a feed movement to the stock-carrier.

8. The combination, with a stock-carrier having a split end provided with stock-engaging jaws, of means for rotating the carrier; and obliquely-disposed rollers for advancing said carrier.

9. The combination, with a feed-tube having jaws at one end, of rollers adapted to engage the periphery of said tube; a chuck in which said rollers are mounted; means for rotating said chuck; and an obliquely-disposed device for imparting a feed movement to said tube.

10. The combination, with a feed-tube, of rollers adapted to engage the periphery of said tube; a chuck carrying said rollers; means for rotating the chuck; obliquely-disposed feed-rollers for advancing said tube; and means for throwing the feed-rollers into and out of contact with the tube.

11. The combination, with a carrier, of interchangeable jaws having faces for engaging stock of different forms, adapted to be secured to said carrier.

12. The combination, with a stock-carrier, of interchangeable jaws adapted to engage different forms of stock; means for securing said jaws to the carrier; and means for imparting a feed movement to the carrier.

13. The combination, with a stock-carrier, of interchangeable sets of jaws, each set having a grasping-face of different conformation from that of another set; means for rotating said carrier; and means for imparting a feed movement to the carrier.

14. The combination, with a stock-carrier, of interchangeable sets of jaws, one set conforming to the configuration of one shape of stock and another set to that of another shape of stock, of interchangeable bushings having bores of different shapes; and means for securing said bushings in position in line with the carrier.

15. The combination, with a carrier having stock-grasping jaws at one end and stock-engaging means at its opposite end, of means for rotating said carrier; and obliquely-disposed means for imparting a feed movement to the carrier.

16. The combination, with a carrier having means for engaging stock, of interchangeable bushings adapted to be secured to said carrier, each bushing having a bore of a shape to conform to the configuration of the stock which it is intended to receive.

17. The combination, with a carrier having jaws with engaging faces of a shape to fit the configuration of the stock, of interchangeable bushings adapted to be secured to said carrier, each bushing having a bore of the configuration of the stock which it is intended to receive; means for rotating the carrier; and means for imparting a feed movement to the carrier.

18. The combination, with a carrier having jaws with engaging faces of the shape of the stock at one end, of a bushing having a bore of the shape of the stock located at the opposite end of said carrier; rollers adapted to engage said carrier and between which it may move longitudinally; means for revolving said rollers; and means for imparting a feed movement to the carrier.

19. In feed mechanism for metal-working machines, the combination, with a feed-tube, of stock-grasping means carried by said feed-tube; means for rotating the feed-tube; a chuck; and obliquely-disposed means for imparting an advancing movement to the feed-tube to cause it to feed the stock to said chuck.

20. The combination, with a feed-tube having a resilient end provided with stock-engaging jaws, of means for rotating said feed-tube; and obliquely-disposed, ribbed rollers for imparting ah advancing movement to the feed-tube.

21. The combination, with a feed-tube having a resilient end, of jaws detachably secured in said end; a bushing detachably secured to said tube at its opposite end; means for rotating the feed-tube; means for imparting an advancing movement to said feed-tube; and means for retracting the feed-tube.

22. The combination, with a tubular stock-carrier having jaws at one end, of a collar sleeved upon the opposite end of said carrier; and a bushing secured to said collar in line with the opening in the stock-carrier.

23. The combination, with a tubular stock-carrier, of a collar sleeved upon said carrier; means for securing the collar to the carrier; a bushing secured in said collar in line with the carrier; and means for imparting a feed movement to the carrier.

24. The combination, with a feed-tube, of stock-grasping jaws removably secured to said tube; means for imparting a feed movement to said tube; a split collar attached to an end of the feed-tube; and means for supporting said collar.

25. The combination, with a feed-tube, of stock-grasping means carried by said tube; a stationary support; means carried by said support for feeding the tube; means for supporting the rear end of the tube; and a guide for the tube-supporting means.

26. The combination, with a feed-tube, of removable stock-grasping means secured to one end of said tube; a collar secured to the other end of said tube; means for supporting the collar for rotary and reciprocatory movement; means for rotating the feed-tube; and obliquely-disposed means for imparting a forward movement to said feed-tube.

27. The combination, with a feed-tube, of stock-grasping jaws carried by said feed-tube; a collar secured to said feed-tube; a bushing, through which the stock passes, secured to said collar; means for supporting the collar for rotary and reciprocatory movements; means for rotating the feed-tube; obliquely-disposed means for advancing the feed-tube; a chuck to which the stock is fed by said tube; and means for retracting the feed-tube upon the stock when held by the chuck.

28. The combination, with a stock-carrier, of a chuck; means for securing said chuck against rotation; obliquely-disposed feed-rollers; means, constituting a part of the chuck, for forcing said feed-rollers into, and withdrawing them from, contact with the stock-carrier; and means for rotating said stock-carrier.

29. The combination, with a stock-carrier, of a stationary chuck; blocks movable in guideways of the chuck; obliquely-disposed feed-rollers mounted in the blocks; means for advancing and retracting said blocks to force the feed-rollers against, and withdraw them from, the stock-carrier; a rotary chuck; and means carried by said rotary chuck for engaging the stock-carrier and rotating the same.

30. The combination, with a stock-carrier, of a stationary chuck; obliquely-disposed means carried by said chuck for imparting a feed movement to the stock-carrier; a rotary chuck; and grooved rollers carried by the rotary chuck for imparting a rotary movement to the stock-carrier.

31. The combination, with a stock-carrier, of a stationary chuck having a hub secured to the machine-frame; movable blocks carried by the chuck; feed-rollers mounted in the blocks and located obliquely to the ends thereof; means for actuating the blocks; a rotary chuck; blocks mounted in said rotary chuck; grooved rollers mounted in said blocks; and means for actuating said blocks.

32. The combination, with a removable stock-carrier, of means for feeding said carrier, a movable support for said carrier; and means for so mounting said support that it may be thrown out of the feed-path of the stock when said carrier is removed.

33. The combination, with a feed-tube, of a support for one end of said feed-tube; means for detachably mounting the feed-tube in said support; a guide for said support and upon which the support may be swung out of the path of the stock when the feed-tube is removed; a standard; and a spring between said standard and a part of the support.

34. The combination, with a feed-tube, of a sleeve having an eye; a collar carried by the tube and mounted in said eye; means for rotating the feed-tube; obliquely-disposed means for imparting a feed movement to said feed-tube; a guide for the sleeve; and means for retracting the feed-tube.

35. The combination, with a feed-tube having a split end, of jaws detachably connected to said tube and having faces conforming to the outline of the stock; means for rotating said feed-tube; a stationary support; and obliquely-disposed means carried by the support for advancing the feed-tube.

36. The combination, with a feed-tube having a split end, of pairs of interchangeable jaws, each pair of jaws having a different form of grasping-face from any other pair, and each jaw having a back conforming to the shape of the inner wall of said feed-tube; and means for detachably securing said jaws to the feed-tube.

37. The combination, with a feed-tube having a split end, of jaws having convex backs and inner grasping-faces, the latter conforming to the shape of the stock; means for detachably securing said jaws to the split end of the tube; a bushing having a bore conforming to the shape of the stock; means for detachably securing said bushing to said tube; means for advancing said feed-tube; a chuck; means for closing the chuck upon the stock; and means for retracting the feed-tube.

38. The combination, with a chuck, and with means for actuating the same, of a hollow spindle; a feed-tube; means for grasping stock carried by said feed-tube; obliquely-disposed means for imparting a feed movement to the feed-tube to cause it to advance the stock through the hollow spindle and chuck; means for rotating the feed-tube; and means for retracting the feed-tube along the stock while the latter is held by the chuck.

39. The combination, with a chuck, of a device for supporting and rotating said chuck; a hollow spindle carrying a device for closing the chuck; means for actuating said hollow spindle; a feed-tube movable back and forth with relation to the chuck-supporting device; rollers for rotating said feed-tube; a support for said rollers, said support being secured to the chuck-rotating device; obliquely-disposed feed-rollers and a stationary support for said feed-rollers.

40. The combination, with a chuck, of a hollow spindle in the head of which said chuck is supported; a tubular spindle within said hollow spindle; means carried by the tubular spindle for closing the chuck upon a stock rod or bar; means for actuating said tubular spindle; a feed-tube having a resilient end; stock-grasping jaws carried by said feed-tube; a chuck secured to the hollow spindle; rollers having peripheries adapted to engage the feed-tube; means carried by said chuck for actuating said rollers; a stationary chuck; obliquely-disposed feed-rollers movably mounted in said chuck; and means for actuating the feed-rollers.

41. The combination, with a feed-tube having means for grasping the stock; of a stepped collar secured to said tube, said collar having a split portion; an eye loosely fitted over one of the steps of said collar; a ring secured to another step of said collar on one side of the eye; a bushing mounted in the collar and abutting against the feed-tube; a sleeve to which the eye is connected; a guide-rod upon which said sleeve is movable; means for retracting the sleeve and thereby the feed-tube; means for rotating the feed-tube; and means for advancing said feed-tube.

42. The combination, with a feed-tube, and with means for rotating said feed-tube, of a stationary chuck; a series of ribbed feed-rollers obliquely disposed with relation to the feed-tube; and means carried by the chuck for forcing said feed-rollers toward and from the feed-tube.

43. The combination, with a feed-tube, of a chuck, means for rotating said chuck; supports carried by the chuck; means for actuating said supports; rollers journaled in the supports and having concave, ribbed peripheries; a stationary chuck facing the first-named chuck; supports carried by said stationary chuck; feed-rollers disposed obliquely to the periphery of the feed-tube and journaled in said supports; and means carried by the stationary chuck for forcing said feed-rollers against the feed-tube.

44. The combination, with a feed-tube, of jaws for grasping stock carried by said feed-tube and located at one end of the same; a collar having stepped portions secured to the other end of said feed-tube, one of said stepped portions being slit transversely and longitudinally of the collar; means for tightening said split portion upon the feed-tube; a ring secured to the rear end of the feed-tube; a movably-mounted sleeve having an eye loosely fitted upon a stepped portion of the collar between the ring and split portion thereof; means for guiding said sleeve; means for imparting a feed movement to the feed-tube; and means for retracting the sleeve and thereby said feed-tube to enable the stock-grasping jaws carried thereby to assume a new position on the stock.

45. The combination, with a chuck, of feed mechanism for advancing stock of a given cross-section to said chuck; and means operable by said feed mechanism for advancing stock of a different cross-section to said chuck.

46. In a machine of the class specified, the combination, with a chuck, of mechanism for feeding circular stock to said chuck; and means adapted to be engaged by said feed mechanism for feeding stock of a different cross-section to the chuck.

47. In a machine of the class specified, the combination, with obliquely-disposed feed mechanism, of a stock-carrier engaged by said feed mechanism.

48. The combination, with a chuck, of stock-feeding mechanism; a removable stock-carrier engaged by said stock-feeding mechanism; and interchangeable jaws carried by said stock-carrier, whereby stock of either circular or angular cross-section may be fed to the chuck.

49. In a machine of the class specified the combination, with mechanism for feeding stock of a given cross-section, of an attachment for feeding stock of a different cross-section, said attachment being adapted to be engaged by said feed mechanism.

50. The combination, with a stock-carrier, of rollers adapted to engage said stock-carrier, said rollers having movement upon their supports, whereby they will conform to irregularities in the surface of the stock-carrier; and means for revolving the rollers.

51. The combination, with a stock-carrier, of concave rollers adapted to engage said carrier; a revoluble support for said rollers; and means carried upon said support, and upon which the rollers are mounted for lateral play.

52. The combination, with a feed-tube having means for engaging stock, of rollers having concaved and ribbed peripheries for engaging said tube; a revoluble chuck; and means carried by the chuck and upon which the rollers are journaled to have a limited lateral play.

53. In a machine of the class specified, the combination, with a rotary chuck having guideways, of blocks mounted in said guideways; rollers journaled in said blocks and so supported that they have lateral movement; a stock-carrier; and means for advancing and withdrawing the blocks.

54. In a machine of the class specified, the combination with a stock-carrier, of a rotary chuck; rollers adapted to have a lateral movement on their supports carried by said chuck; supports for said rollers; means for permitting a yielding movement of said supports; and means for advancing and withdrawing the roller-supports.

55. The combination, with a stock-carrier, of rollers adapted to engage said carrier; a rotary chuck; means for yieldingly supporting said rollers in the chuck; and journals carried by the roller-supports and upon which the rollers have lateral play.

56. The combination, with a feed-tube, of a rotary chuck having guideways; blocks mounted in said guideways; means for advancing and retracting the blocks; yielding devices carried by the blocks; journals mounted in the blocks; and rollers engaging the feed-tube, and mounted for lateral movement on said journals.

In testimony whereof I affix my signature in presence of two witnesses.

BENGT M. W. HANSON.

Witnesses:
ARTHUR E. THAYER,
J. W. CHAPMAN.